(12) United States Patent
Huang

(10) Patent No.: US 9,195,012 B2
(45) Date of Patent: Nov. 24, 2015

(54) OPTICAL FIBER CONNECTOR

(71) Applicant: HON HAI PRECISION INDUSTRY CO., LTD., New Taipei (TW)

(72) Inventor: Po-Wei Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/597,397

(22) Filed: Jan. 15, 2015

(65) Prior Publication Data

US 2015/0205052 A1     Jul. 23, 2015

(30) Foreign Application Priority Data

Jan. 23, 2014 (TW) .............................. 103102440 A

(51) Int. Cl.
  *G02B 6/38*       (2006.01)
(52) U.S. Cl.
  CPC .............. *G02B 6/387* (2013.01); *G02B 6/3826* (2013.01); *G02B 6/3858* (2013.01); *G02B 6/3885* (2013.01)
(58) Field of Classification Search
  CPC .... G02B 6/387; G02B 6/3826; G02B 6/3858; G02B 6/3885

USPC ...................................................... 385/71, 81
See application file for complete search history.

(56) References Cited

U.S. PATENT DOCUMENTS

2011/0243507 A1* 10/2011 Kim et al. ....................... 385/78

\* cited by examiner

*Primary Examiner* — Jerry Blevins
(74) *Attorney, Agent, or Firm* — Novak Druce Connolly Bove + Quigg LLP

(57) ABSTRACT

An optical fiber connector includes a first main body, at least one optical fiber and a fastening element. The first main body includes a first surface and a second surface. A receiving recess is defined in the first surface; at least one recess is defined on the bottom surface of the receiving recess. The optical fibers are fastened in the recesses. The fastening element is received in the receiving recess, and has a third surface and a fourth surface. At least one restricting recess is defined on the third surface and through the fourth surface. At least one orientating hole is defined on the fastening element. The orientating pole and the orientating hole are coordinating with each other to fasten the fastening element in the receiving recess, therefore make the restricting recess and the corresponding orientating recess coordinate with each other to fasten the corresponding optical fiber.

9 Claims, 3 Drawing Sheets

OPTICAL FIBER CONNECTOR

FIELD

The subject matter herein generally relates to connectors, particularly to an optical fiber connector.

BACKGROUND

An optical fiber connector includes a housing and optical fibers. Openings are defined on the housing and the fibers are engaged on the housing through the openings by a fastening element.

BRIEF DESCRIPTION OF THE DRAWINGS

Implementations of the present technology will now be described, by way of example only, with reference to the attached figures.

DETAILED DESCRIPTION

Figure 1:
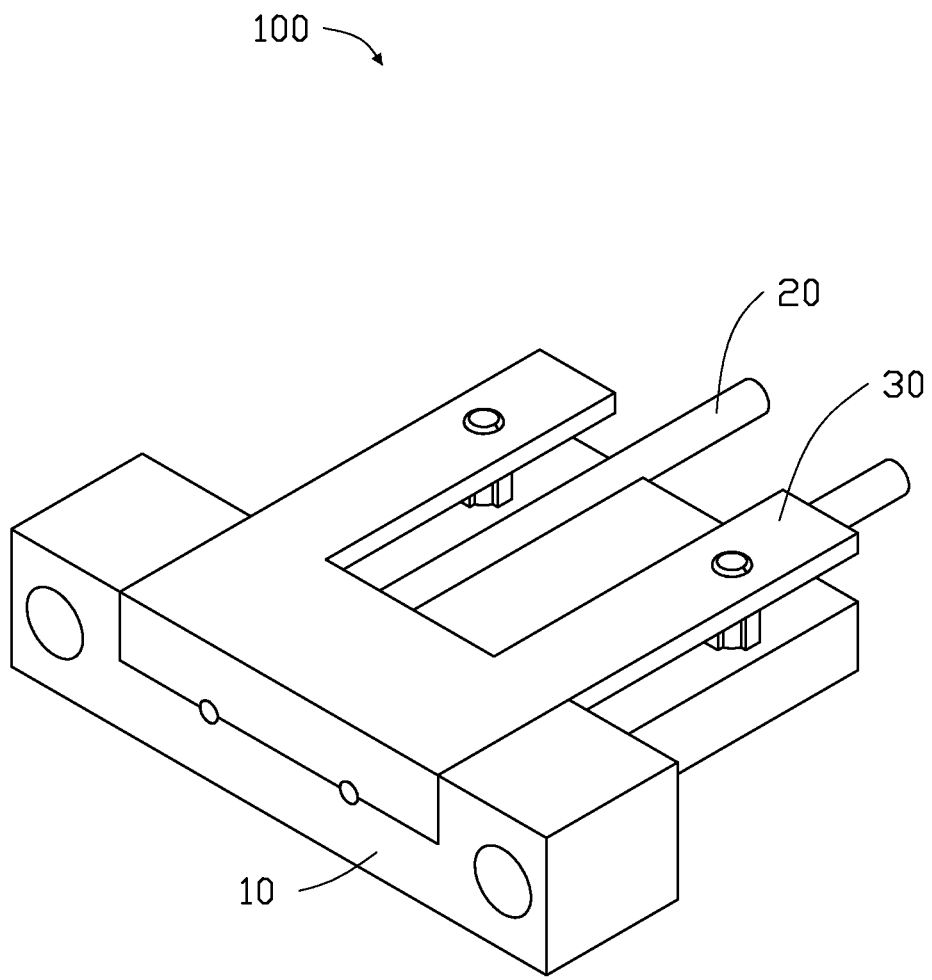
FIG. 1 is an exploded view of an optical fiber connector according to one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure is described in relation to an optical fiber connector.

Figure 2:
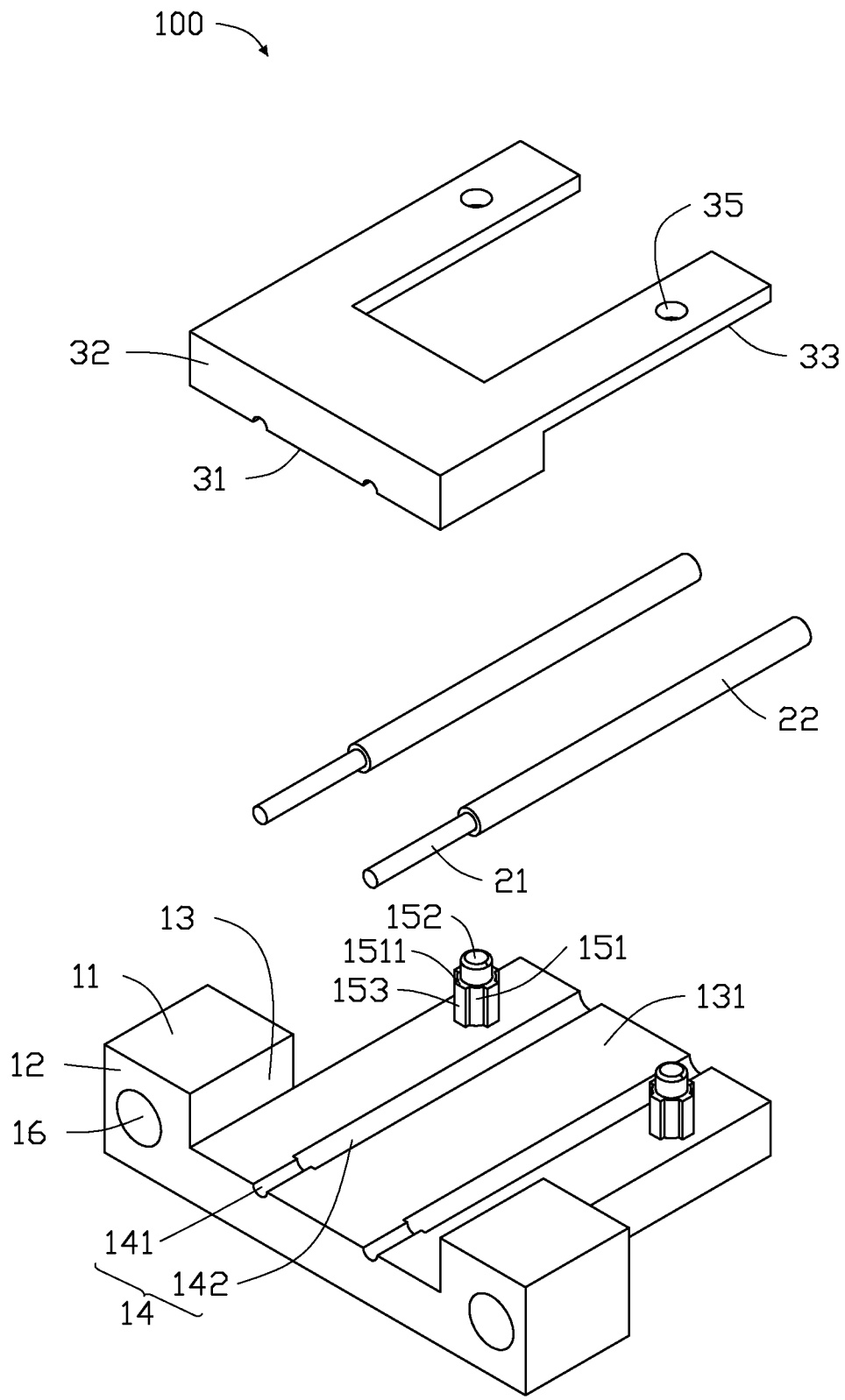
FIG. 2 is an exploded view of an optical fiber connector according to one embodiment.

FIG. 1 illustrates an isometric view of an optical fiber connector according to one embodiment of present disclosure. FIG. 2 illustrates an exploded view of an optical fiber connector according to one embodiment of present disclosure. The optical fiber connector 100 of the preferable embodiment of present disclosure comprises a first main body 10, two optical fibers 20 and a fastening element 30.

FIGS. 1-2 illustrate that the first main body 10 has a T-shaped configuration, and comprises a first surface 11 and a second surface 12 which is perpendicularly connected with the first surface 11. A receiving recess 13 is defined on the first surface 11, and comprises a bottom surface 131 which is perpendicularly connected with the second surface 12. Two orientating recesses 14 which are perpendicular with the second surface 12 are defined on the bottom surface 131, and can be used to fix two optical fibers 20. The cross-section of the surface of the orientating recess 14 which is perpendicular to the length is a half-circle, each orientating recess 14 comprises a first segment 141 and a second segment 142 which are interconnected with each other. The first segment 141 and the second segment 142 share an axis, and the diameter of the first segment 141 is smaller than the diameter of the second segment 142.

The first main body 10 further comprises two orientating poles 15 fixed on the bottom surface 131 of the receiving recess 13 and positioned on the two sides of the orientating recess 14. Each orientating pole 15 comprises a second main body 151, a cylinder 152 and a plurality of rib structures 153 which space apart from each other along the second main body 151. Each second main body 151 has cylinder shape configuration, the second main body 151 comprises a hosting surface 1511, and the hosting surface 1511 is perpendicular with the plurality of the rib structures 153. Each cylinder 152 is perpendicularly fixed on the hosting surface 1511, and the cylinder 152 and the second main body 151 share an axis. The two cylinders 152 are used to guide the first main body 10 to connect to the fastening element 30, and the plurality of rib structures 153 are used to strengthen the structure strength of the first main body 10. In this embodiment, every orientating pole 15 has four rib structures 153.

Figure 3:
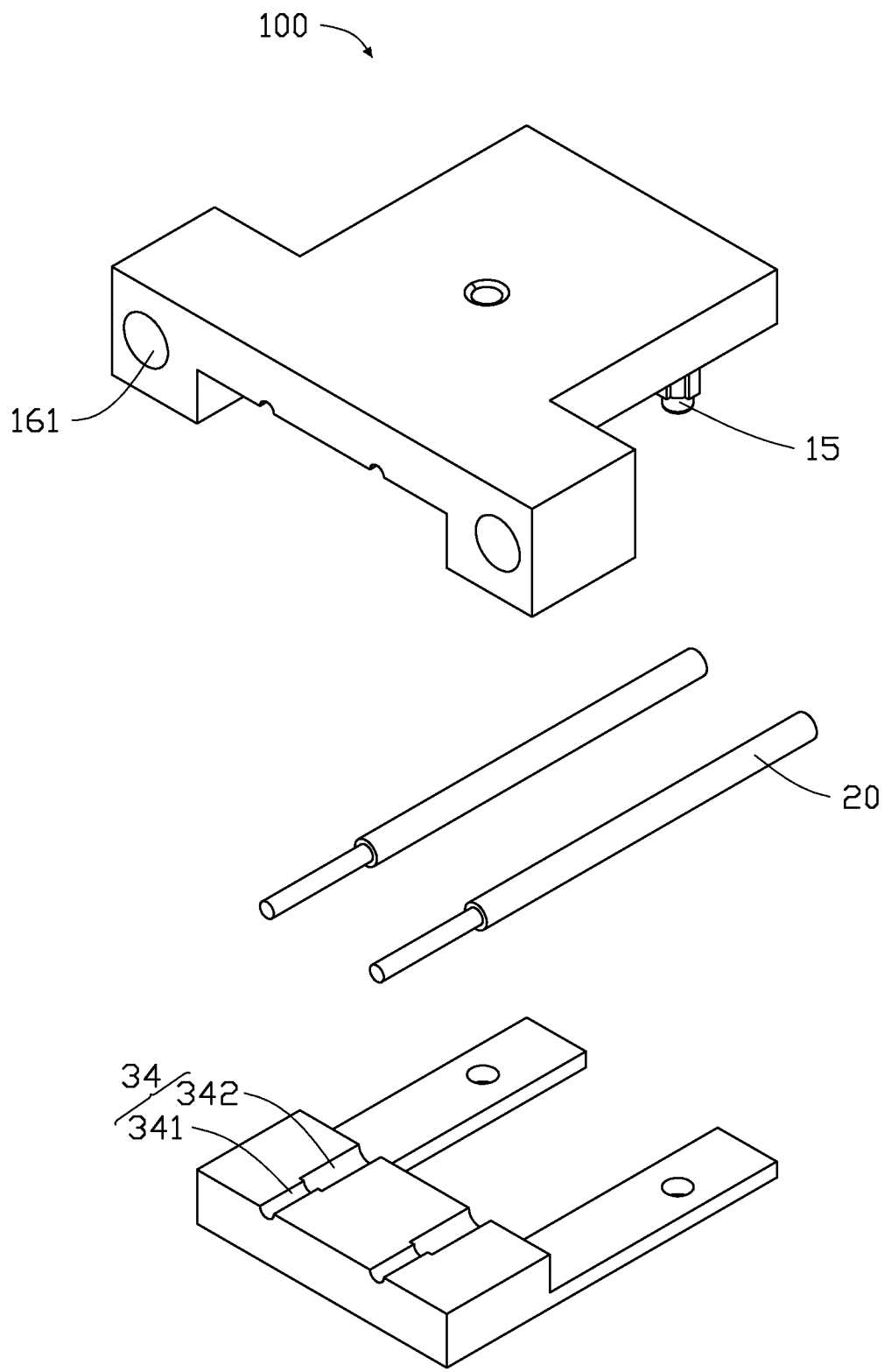
FIG. 3 is similar to FIG. 2, but viewed from another angle.

FIG. 3 illustrates another angle of view of an optical fiber connector according to one embodiment of present disclosure. The first main body 10 further comprises an orientating structure 16 which is used to connect with the orientating structure 16 of other optical fiber connectors. In the embodiment, the orientating structures 16 are two through holes 161, and the axis of the two through holes 161 are parallel with the axis of the two orientating recesses 14, the two through holes 161 penetrate the second surface 12 along the direction parallel with the bottom surface 131. In other embodiments, the orientating structure can be an orientating pole fixed on the second surface 12.

In the embodiment, each optical fiber 20 is cylinder shaped. The optical fiber 20 comprises a third segment 21 and a fourth segment 22 which interconnects with the third segment 21, and the diameter of the fourth segment 22 is larger than the diameter of the third segment 21. The diameter of the fourth segment is smaller than the diameter of the second segment 142, and the diameter of the third segment 21 is smaller than the diameter of the first segment 141.

FIGS. 2 and 3 illustrate that in the embodiment, the fastening element 30 has a n-shaped configuration, and comprises a third surface 31, a fourth surface 32 which is perpendicularly connected with the third surface 31, and a fifth surface 33 parallel with the third surface 33. Two restricting recesses 34 are defined on the third surface 31, and the cross-section of the surface is perpendicular to the length of the restricting recess 34 and is a half-circle. Each restricting recess 34 comprises a fifth segment 341 and a sixth segment 342 which is interconnected with the fifth segment 341. The diameter of the fifth segment 341 is equal to the diameter of the first segment 141, and the diameter of the sixth segment 342 is equal to the diameter of the second segment 142.

The axis of two orientating holes 35 are perpendicular with the fifth surface 33 and are defined on the fastening element 30, and the orientating holes 35 penetrate through the fifth surface 33. The positions of the orientating holes 35 are corresponding to the positions of the orientating poles 15.

In this embodiment, the two optical fibers 20 are positioned on the orientating recesses 14 of the first main body 10, and the third segment 21 of the optical fiber 20 is positioned in the corresponding first segment 141; the fourth segment 33 is positioned in the corresponding second segment 142. The two orientating poles 15 are coordinated with the corresponding orientating hole 35 to fasten the third surface 31 of the fastening element 30 to the button surface 131 of the receiving recess 13. Therefore each orientating recess 14 is coordinated with the corresponding restricting recess 34 to fasten the corresponding optical fiber 20, and the fifth surface 33 is attached on the hosting surface 1511.

The present disclosure provides an optical fiber connector which is fastened to the fastening element on the first main body by the orientating pole of the first main body coordinating with the orientating hole of the fastening element.

The numbers of the orientating recess 14, the orientating pole 15, the optical fiber 20, restricting recess 34 and the orientating hole 35 are not restricted to two; the number can be adjusted if necessary.

The embodiments shown and described above are only examples. Many details are often found in the art such as the other features of a optical fiber connector. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A optical fiber connector comprising:
a first main body;
at least one optical fiber; and
a fastening element,
wherein the first main body comprises a first surface and a second surface which perpendicularly connects with the first surface, a receiving recess is defined on the first surface, at least one orientating recess is defined on a bottom surface of the receiving recess, the lengthwise of the receiving recess is perpendicular to and through the second surface, the first main body also comprises at least one orientating pole which is fastened on the bottom surface of the receiving recess, wherein the at least one orientating pole comprises a second main body in cylinder, a cylinder on the second main body and a plurality of rib structures space apart with each other along the second main body;
the at least one optical fiber is received in the at least one orientating recess, the fastening element which is received in the receiving recess has a third surface and a fourth surface, wherein the third surface attached on the bottom surface of the receiving recess and the fourth surface is perpendicularly connected with the third surface, at least one restricting recess is defined on the third surface and the lengthwise of the restricting recess is perpendicular to and through the fourth surface, at least one orientating hole which corresponding to the at least one orientating pole is defined on the fastening element, the orientating hole coordinate with the orientating pole to positioning the fastening element on the bottom surface of the receiving recess, therefore make each restricting recess coordinate with corresponding orientating recess to position the corresponding optical fiber.

2. The optical fiber connector of claim 1, wherein each cylinder guides the first main body to conjugate with the fastening element.

3. The optical fiber connector of claim 1, wherein the plurality of rib structures strengthen the intensity of the second main body.

4. The optical fiber connector of claim 1, wherein the number of the rib structure are four.

5. The optical fiber connector of claim 1, wherein an axis of each cylinder and an axis of the second main body are on the same line.

6. The optical fiber connector of claim 1, wherein the cross-section of the orientating recess in lengthwise is semicircle.

7. The optical fiber connector of claim 1, wherein the cross-section of the restricting recess in lengthwise is semicircle.

8. The optical fiber connector of claim 1, further comprises a orientating structure, wherein the orientating structure conjugate with other orientating structure of other optical fiber connector to connect optical fiber connector with each other.

9. A optical fiber connector comprising:
a first main body comprising a first surface and a second surface perpendicularly connected with the first surface, wherein the first surface defines a receiving recess having a bottom surface that defines at least one orientating recess and a lengthwise dimension that is perpendicular to the second surface;
the first main body also comprises at least one orientating pole which is fastened on the bottom surface of the receiving recess, wherein the at least one orientating pole comprises a second main body in cylinder, a cylinder on the second main body and a plurality of rib structures space apart with each other along the second main body;
the at least one optical fiber is received in the at least one orientating recess; and
a fastening element is received in the receiving recess and having a third surface attached on the bottom surface of the receiving recess and a fourth surface perpendicularly connected with the third surface, wherein the third surface defines at least one restricting recess and the lengthwise of the restricting recess is perpendicular to and through the fourth surface, the fastening element defining at least one orientating hole corresponding to the at least one orientating pole, the orientating hole configured to cooperate with the orientating pole to positioning the fastening element on the bottom surface of the receiving recess, thereby each restricting recess is configured to corresponding with a respective orientating recess to position the corresponding optical fiber.

* * * * *